US010949522B2

(12) United States Patent
Gadge et al.

(10) Patent No.: US 10,949,522 B2
(45) Date of Patent: Mar. 16, 2021

(54) AUTHENTICATION OF USER IDENTITY USING A VIRTUAL REALITY DEVICE

(71) Applicant: International Business Machines Corporation, Armonk, NY (US)

(72) Inventors: Vaibhav Gadge, Pune (IN); Romil J. Shah, Kothrud (IN)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 15/832,175

(22) Filed: Dec. 5, 2017

(65) Prior Publication Data

US 2019/0171807 A1 Jun. 6, 2019

(51) Int. Cl.
*H04L 29/06* (2006.01)
*G06F 21/00* (2013.01)
*G06F 21/36* (2013.01)
*G06F 3/01* (2006.01)

(52) U.S. Cl.
CPC .............. *G06F 21/36* (2013.01); *G06F 3/017* (2013.01); *H04L 63/08* (2013.01)

(58) Field of Classification Search
CPC ........... G06F 21/36; G06F 3/017; H04L 63/08
See application file for complete search history.

(56) References Cited

U.S. PATENT DOCUMENTS

| 6,911,969 | B1 * | 6/2005 | Nelson | G06F 1/163 |
| | | | | 345/163 |
| 9,578,119 | B2 * | 2/2017 | Lin | H04L 67/36 |
| 2003/0013483 | A1 * | 1/2003 | Ausems | H04M 1/72522 |
| | | | | 455/556.1 |
| 2004/0220922 | A1 * | 11/2004 | Lovison | H04W 8/18 |
| 2010/0250327 | A1 * | 9/2010 | Relyea, Jr. | G06Q 30/02 |
| | | | | 705/14.53 |
| 2013/0174223 | A1 * | 7/2013 | Dykeman | G06F 21/10 |
| | | | | 726/4 |
| 2014/0127667 | A1 * | 5/2014 | Iannacone | G09B 5/02 |
| | | | | 434/379 |
| 2014/0237578 | A1 * | 8/2014 | Bryant | G06Q 10/10 |
| | | | | 726/7 |

(Continued)

FOREIGN PATENT DOCUMENTS

CN 106527697 A 3/2017

*Primary Examiner* — Lisa C Lewis
(74) *Attorney, Agent, or Firm* — Troutman Pepper Hamilton Sanders LLP (57) ABSTRACT

Embodiments can provide a computer implemented method in a computing system including a processor and a memory comprising instructions, which are executed by the processor to cause the processor to implement a system for virtual reality user authentication, the method including responsive to a user request, generating, by a virtual reality system, a virtual reality authentication program splash screen based on at least one of a user profile and one or more real-life activities of the user; activating, by the virtual reality system, a virtual reality authentication module; prompting, through the virtual reality system, the user to perform one or more real-life tasks specific to the user involving motions using the virtual reality system; recording, through the virtual reality system, the motions using one or more sensors; and storing, using an authentication server, the motions of the at least one of the user as authentication requirements for accessing a virtual reality program.

19 Claims, 4 Drawing Sheets

(56) References Cited

U.S. PATENT DOCUMENTS

| | | | |
|---|---|---|---|
| 2014/0310764 A1* | 10/2014 | Tippett | G06F 21/31 726/1 |
| 2015/0120771 A1* | 4/2015 | Lee | G06Q 50/01 707/758 |
| 2015/0141136 A1* | 5/2015 | Ahuja | A63F 13/54 463/29 |
| 2016/0178906 A1* | 6/2016 | Rider | G02B 27/017 726/17 |
| 2017/0039829 A1 | 2/2017 | Kerzner | |
| 2017/0178260 A1 | 6/2017 | Wilde | |
| 2018/0107816 A1* | 4/2018 | Wu | G02B 27/017 |

\* cited by examiner

AUTHENTICATION OF USER IDENTITY USING A VIRTUAL REALITY DEVICE

TECHNICAL FIELD

The present application relates generally to a system and method that can be used to authenticate user identity using virtual reality devices.

BACKGROUND

Virtual reality (VR) is one of the most widely discussed concepts in technology circles. Virtual reality headsets have the potential to make significant changes in the way consumer experiences work. Currently, the authentication system using various techniques to authenticate a user (most commonly, simple authentication using a user id and password, sometimes using multi-factor authentication to verify the identity of user), are quite old techniques and very monotonous, with no customization possible based on user personal profiles and/or interests.

SUMMARY

Embodiments can provide a computer implemented method in a computing system comprising a processor and a memory comprising instructions, which are executed by the processor to cause the processor to implement a system for virtual reality user authentication, the method comprising: responsive to a user request, generating, by a virtual reality system, a virtual reality authentication program splash screen based on at least one of a user profile and one or more real-life activities of the user; activating, by the virtual reality system, a virtual reality authentication module; prompting, through the virtual reality system, the user to perform one or more real-life tasks specific to the user involving motions using the virtual reality system; recording, through the virtual reality system, the motions using one or more sensors; and storing, using an authentication server, the motions of the at least one of the user as authentication requirements for accessing a virtual reality program.

Embodiments can further provide a computer program product for virtual reality user authentication, the computer program product comprising a computer readable storage medium having program instructions embodied therewith, the program instructions executable by a processor to cause the processor to: responsive to a user request, generate, by a virtual reality system, a virtual reality authentication program splash screen based on at least one of a user profile and one or more real-life activities of the user; activate, by the virtual reality system, a virtual reality authentication module; prompt, through the virtual reality system, the user to perform one or more real-life tasks specific to the user involving motions using the virtual reality system; record, through the virtual reality system, the motions using one or more sensors; and store, using an authentication server, the motions of the at least one of the user as authentication requirements for accessing a virtual reality program.

Embodiments can even further provide a system for virtual reality user authentication, comprising: a virtual reality system, comprising a display and one or more sensors, configured to: responsive to a user request, generate, by a virtual reality system, a virtual reality authentication program splash screen based on at least one of a user profile and one or more real-life activities of the user; activate, by the virtual reality system, a virtual reality authentication module; prompt, through the virtual reality system, the user to perform one or more real-life tasks specific to the user involving motions using the virtual reality system; record, through the virtual reality system, the motions using one or more sensors; and store, using an authentication server, the motions of the at least one of the user as authentication requirements for accessing a virtual reality program.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

The present invention method uses virtual reality (VR) technology for authentication of user security using a VR system, adding appeal based on user interest during authentication, personalization, increased user friendliness, all in a more secure way, that can avoid over-the-shoulder attacks.

The present invention can have two important aspects: registration and authentication. During registration, embodiments of the present invention can use a virtual reality (VR) based device which could be used to uniquely generate a series of virtual events performed by the end user for validation. In an embodiment, the system can include a mechanism to load a user's custom VR modules, or select and load one of a selection of standard modules as provided by a particular authenticating system. The custom VR modules could be generated based on a user profile or a user's real life activities as collected from different sensor devices or social interactions. At registration, the present invention can register a series of actions or events which can act as a unique password, and can register/store the same in the VR authenticating system.

During authentication, the system can load the custom VR module configured by the end user during registration. The user must perform the series of virtual action or events on the loaded VR module using the VR device. During the performance, the system can capture the virtual actions or events performed and send the same to an authentication server. The authentication server can validate the performed series of virtual actions or events against the same as registered by the user during registration.

Figure 1:
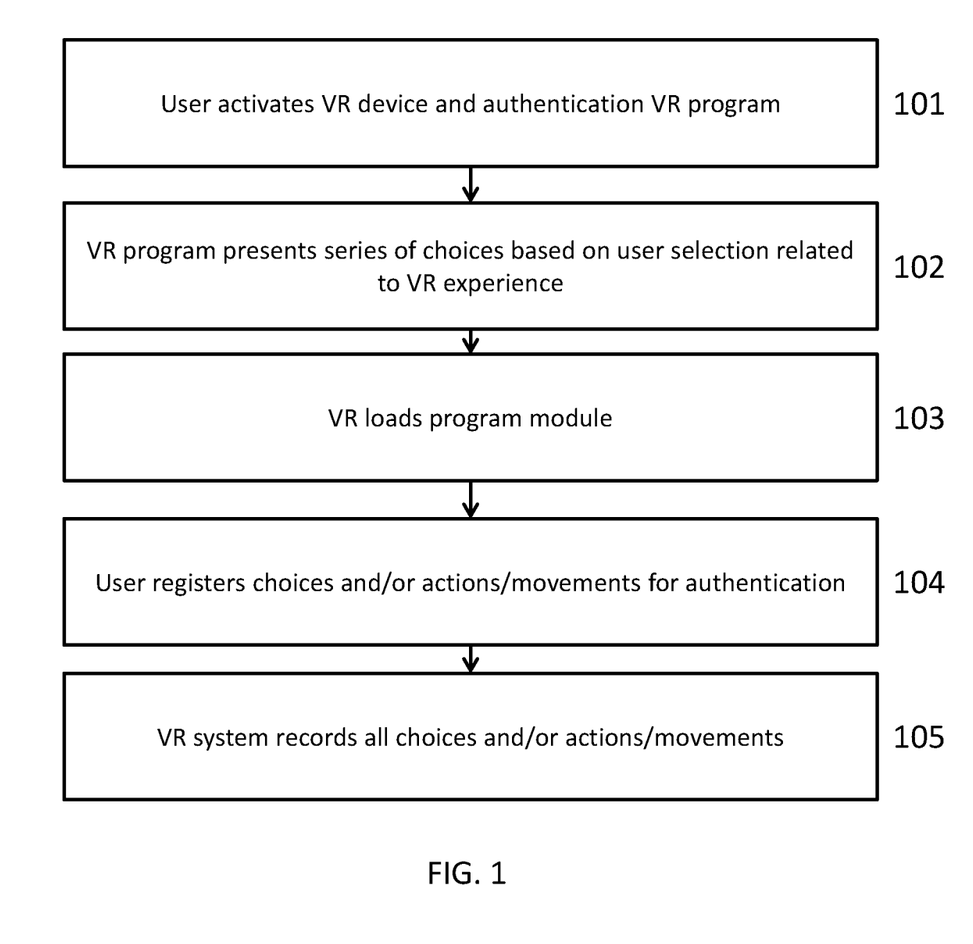
FIG. 1 illustrates a flowchart depicting a registration process for a VR user authentication system, in accordance with embodiments described herein.

FIG. 1 illustrates a flowchart depicting a registration process for a VR user authentication system, in accordance with embodiments described herein. This can be the first step where a system can propose that a VR based device can be used to register a uniquely generated series of events in a VR simulated environment. Any VR system can be used for the VR user authentication system, including, for example, models with gesture or room-sensing technology, hand-held controllers, or merely a look/select ability, such as VR systems based off of mobile phone technology.

To use the virtual reality user registration system, the user can first activate the VR system, along with the primary VR device and the VR authentication program splash screen 101. The VR authentication program splash screen can be customized based upon the user's profile or the user's real-life activities as collected from sensor devices or social interactions. The virtual reality user registration system can then present a series of choices to the user, which can be a listing of applications, virtual worlds, or other VR programs that the user has purchased or that the enterprise system has granted the user potential access to 102. Based on the user's choice, the system can load the selected VR program module 103. In an embodiment, there can be multiple types of VR programs available to load like predefined or custom modules for registration. These predefined programs can be retrieved from an authenticating system, which may be remotely located on a server, or stored on the local machine utilizing the VR technology.

In an embodiment, the virtual reality user registration system can preload a predefined program based on a user's preference, which could be a program generated based on a user's real-life activities. These activities can be captured using motion sensor devices to capture actions and movements from the user's life-like activities. These life-like activities may include any activities a user may carry out during a day. For example, a user may perform a mechanical or repetitious pattern of movements when performing certain tasks (e.g., interacting with friends on a social media website, checking their email, login into their computer system, etc.).

In some embodiments, these real-life activities may be recorded using physical sensors (e.g., motion sensors, image sensors, infrared sensors, etc.). It should be understood, that these "real-life" activities may be, as discussed herein, related to a use utilizing a piece of computer equipment, but they may also be related to any activity in the physical world (e.g., a car mechanic working on a specific model of a car and performing the same steps they would regularly perform). Thus, as discussed herein, when a user attempts to authenticate themselves via a VR system, a custom module (e.g., them checking their email) may be loaded into the VR authentication system and ask them to carry out the various steps required to perform the task at hand.

Once in the desired program module, the registration program can require that the user register one or more choices and/or actions/movements for authentication purposes, which can be used as a physical password for access to the particular program 104. It should be noted, that the specific examples disclosed herein are for illustrative purposes only, and that the registration process may include a custom user module, a pre-defined user module, or a hybrid version including both a custom and pre-defined user module. Choices and actions can include, but are not limited to, performing a particular gesture series, selecting certain buttons in a pattern, identifying shapes or images displayed through the VR system, performing a particular virtual task, entering a passcode, or a combination thereof. Once selected by the user, the virtual reality user registration system can store the captured actions and event information on the VR registration system 105, and can use the information stored as a unique password for future authentication purposes.

In an embodiment, the enterprise supporting the VR based authentication mechanism may allow a user to register different connected applications via their personal or corporate gateway. For example, a user may register data collected from a personal sensor device, such as a wearable device, and connect it to a web service or to a social media account or the like (e.g., cloud account). Thus, an embodiment allows the user to be provided with more real-time experience wherein when an enterprise portal is opened, it may directly list a particular social VR module or a VR module that was captured via a sensor device.

Figure 2:
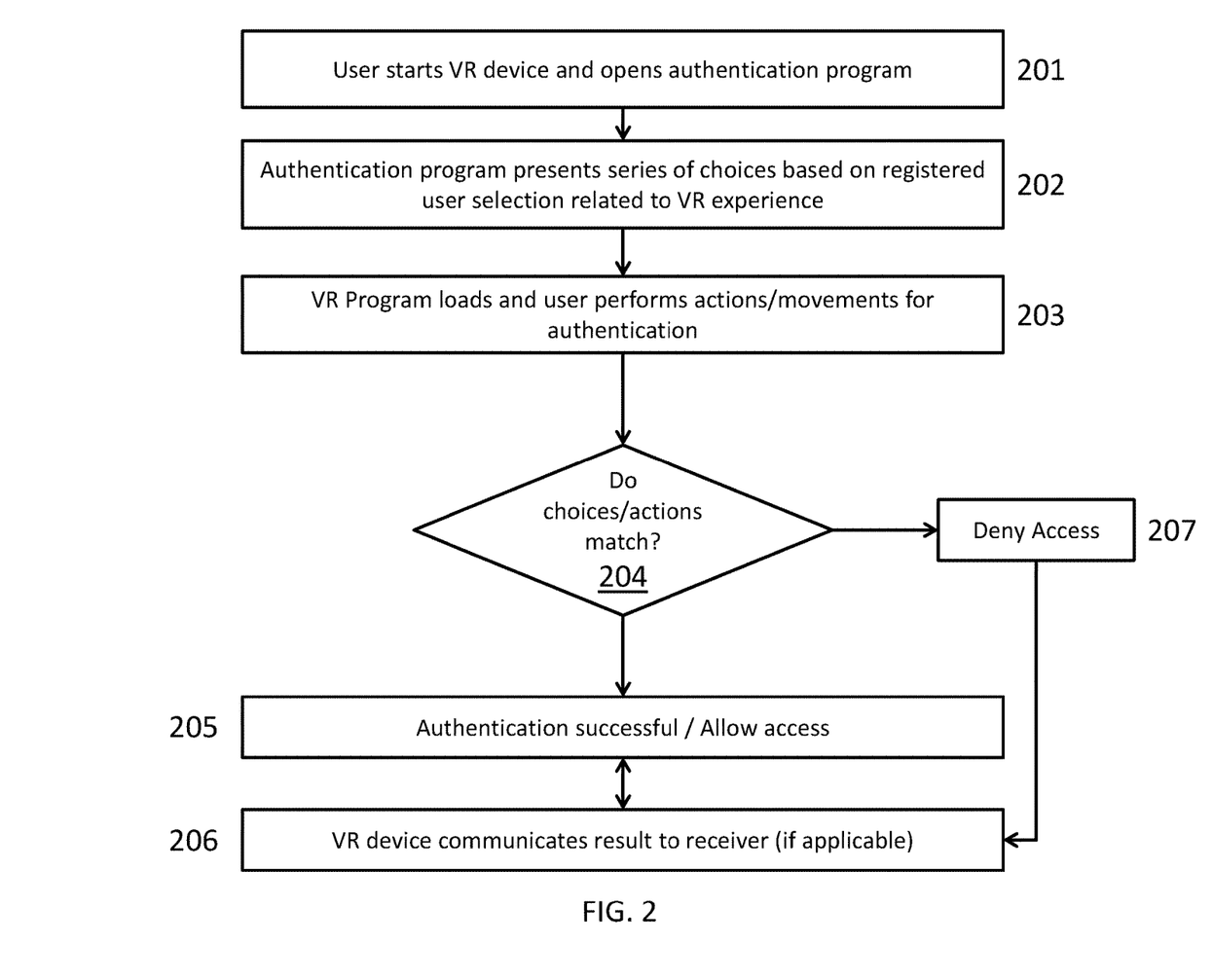
FIG. 2 illustrates a flowchart depicting an authentication process for a VR user authentication system, in accordance with embodiments described herein.

FIG. 2 illustrates a flowchart depicting an authentication process for a VR user authentication system, in accordance with embodiments described herein. During this authentication process, the user can authenticate their identity using the virtual reality user authentication system. As with the registration process, the user can first activate the VR system (if not already activated), along with the primary VR device and the VR authentication program splash screen 201. The virtual reality user authentication system can then present a series of choices to the user, which can be a listing of applications, virtual worlds, or other VR programs that the user has purchased or that the enterprise system has granted the user potential access to 202. Based on the user's choice, the system can load the selected VR program module, at which point the user will be prompted to perform a series of actions/movements in order to move forward with the authentication 203. The prompting can be accomplished visually, haptically, or a combination thereof. The user can perform a series of actions or events, which can be captured by the VR device using one or more sensors, including, but not limited to, motion, position, location, or movement sensors. In an embodiment, the virtual reality user authentication system can send the captured information to the authentication server for validation.

Once the action/movement data is captured, the authenticating system can validate it by determining whether the choices and actions performed by the user match the choices and actions that were previously registered 204. If the performed series of actions and movements in the VR virtual world are a match with the registered actions within a predetermined threshold, the authenticating system can acknowledge the approval/successful authentication and allow access to the program module 205. Additionally, the virtual reality user authentication system can communicate the authentication result to a third-party receiver (such as a security suite or program) 206. In an embodiment, the predetermined threshold can be a small margin of error, and in some embodiments, can require an error-free performance of all required choices/actions. In the event the user fails to reach the predetermined threshold, the virtual reality user authentication system can deny the user access 207, and can return the user back to the main program screen. In an embodiment, the virtual reality user authentication system can communicate the authentication failure to the third-party receiver (such as a security suite or program) 206.

A non-limiting example of using the virtual reality user authentication system may include a car mechanic who wants to authenticate a particular computing system. The mechanic can first open a VR program, where his preferences can be related to his particular expertise, like auto repair of a generic car type or specific car type. In one example, the user has already registered, and as such, the virtual reality user authentication system can proceed directly to authentication. Accordingly, the VR program in one embodiment can show a garage with three different models of car (e.g., a red Mustang, a black Honda Accord, and a blue Chevrolet Corvette). To authenticate, the user must select an action to walk a number of steps in front of the blue Honda Accord, take an action (such as touching the car hood at a particular spot), which can open a hood of one of the cars. The VR program can then show the car engine as the car hood opens. The user can then be required to touch and/or tighten (via a recorded gesture) the left side battery plug displayed onscreen. If the captured actions of the user match the registered actions, the system will authenticate and successfully log in. If incorrect actions are taken (such as selecting the wrong car, selecting the wrong part, or taking an incorrect action on the battery plug), the system can reject the authentication and deny the user access.

Figure 3:
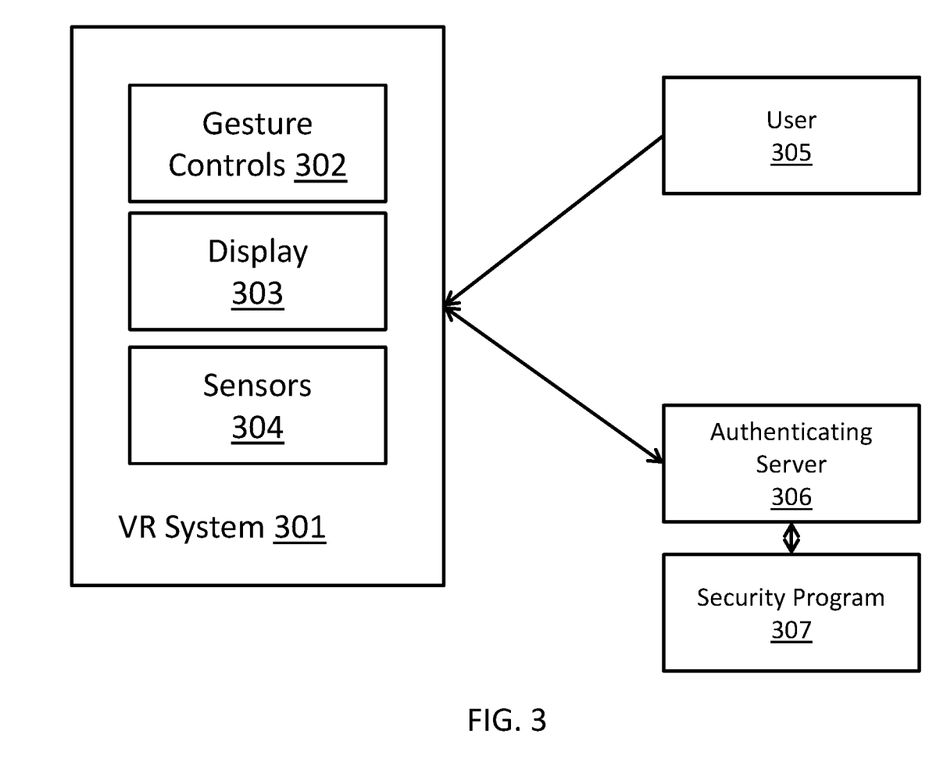
FIG. 3 illustrates a block diagram depicting the components of a virtual reality user authentication system, in accordance with embodiments described herein.

FIG. 3 illustrates a block diagram depicting the components of a virtual reality user authentication system, in accordance with embodiments described herein. As described above, the VR system 301 can have a display 303, one or more gesture controls 302, and one or more sensors 304 to track the user's 305 actions, which can include motion, position, direction, orientation, and/or movement sensors. The gesture controls can have one or more buttons or toggles, which can be touch-sensitive and/or capacitive. The choices and actions of the user 305 captured by the VR system 301 can be communicated to the authenticating server 306, which can be housed remotely or locally. The authenticating server 306 can store recorded authentication sequences, and can communicate if authentication is successful or failed back to the VR system 301. Additionally, the authenticating server 306 can communicate the authentication attempt, success, and/or failure events to a security program 307, which can be connected to a larger network.

Figure 4:
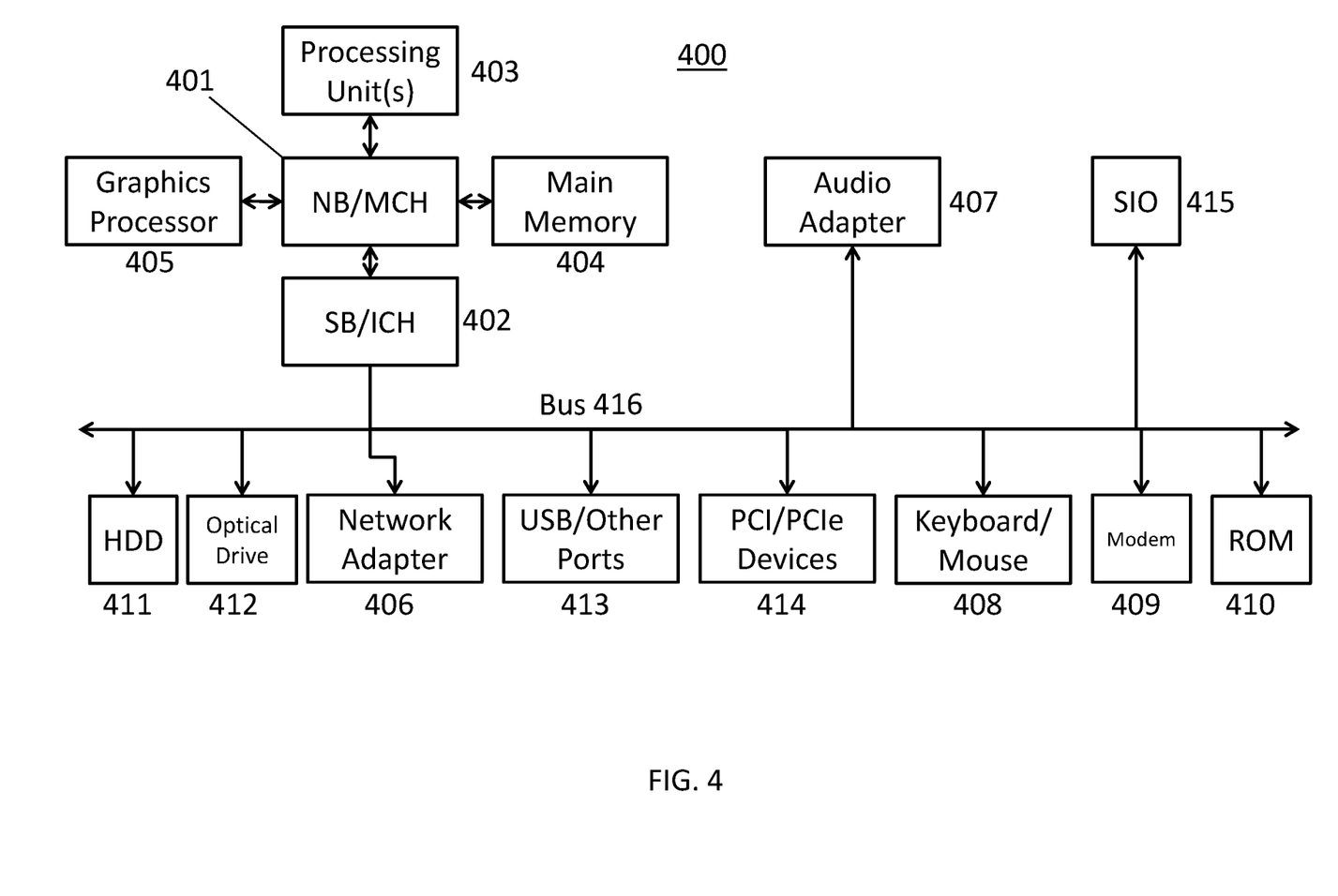
FIG. 4 is a block diagram of an example computing system in which aspects of the illustrative embodiments may be implemented.

FIG. 4 is a block diagram of an example computing system 400 in which aspects of the illustrative embodiments can be implemented. Computing system 400 is an example of a computer, such as a server or client, in which computer usable code or instructions implementing the process for illustrative embodiments of the present invention are located. In one embodiment, FIG. 4 represents a server computing device, such as a server, which implements the virtual reality user authentication system described herein.

In the depicted example, computing system 400 can employ a hub architecture including a north bridge and memory controller hub (NB/MCH) 401 and south bridge and input/output (I/O) controller hub (SB/ICH) 402. Processing unit 403, main memory 404, and graphics processor 405 can be connected to the NB/MCH 401. Graphics processor 405 can be connected to the NB/MCH through an accelerated graphics port (AGP).

In the depicted example, the network adapter 406 connects to the SB/ICH 402. The audio adapter 407, keyboard and mouse adapter 408, modem 409, read only memory (ROM) 410, hard disk drive (HDD) 411, optical drive (CD or DVD) 412, universal serial bus (USB) ports and other communication ports 413, and the PCI/PCIe devices 414 can connect to the SB/ICH 402 through bus system 416. PCI/PCIe devices 414 may include Ethernet adapters, add-in cards, and PC cards for notebook computers. ROM 410 may be, for example, a flash basic input/output system (BIOS). The HDD 411 and optical drive 412 can use an integrated drive electronics (IDE) or a serial advanced technology attachment (SATA) interface. The super I/O (SIO) device 415 can be connected to the SB/ICH.

An operating system can run on processing unit 403. The operating system can coordinate and provide control of various components within the computing system 400. As a client, the operating system can be a commercially available operating system. An object-oriented programming system, such as the Java™ programming system, may run in conjunction with the operating system and provide calls to the operating system from the object-oriented programs or applications executing on the computing system 400. As a server, the computing system 400 can be an IBM® eServer™ System P® running the Advanced Interactive Executive operating system or the Linux operating system. The computing system 400 can be a symmetric multiprocessor (SMP) system that can include a plurality of processors in the processing unit 403. Alternatively, a single processor system may be employed.

Instructions for the operating system, the object-oriented programming system, and applications or programs are located on storage devices, such as the HDD 411, and are loaded into the main memory 404 for execution by the processing unit 403. The processes for embodiments of the virtual reality user authentication system can be performed by the processing unit 403 using computer usable program code, which can be located in a memory such as, for example, main memory 404, ROM 410, or in one or more peripheral devices.

A bus system 416 can be comprised of one or more busses. The bus system 416 can be implemented using any type of communication fabric or architecture that can provide for a transfer of data between different components or devices attached to the fabric or architecture. A communication unit such as the modem 409 or network adapter 406 can include one or more devices that can be used to transmit and receive data.

Those of ordinary skill in the art will appreciate that the hardware depicted in FIG. 4 may vary depending on the implementation. Other internal hardware or peripheral devices, such as flash memory, equivalent non-volatile memory, or optical disk drives may be used in addition to or in place of the hardware depicted. Moreover, the computing system 400 can take the form of any of a number of different computing systems, including but not limited to, client computing devices, server computing devices, tablet computers, laptop computers, telephone or other communication devices, personal digital assistants, and the like. Essentially, computing system 400 can be any known or later developed computing system without architectural limitation.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within in the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The system and processes of the figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method performed in a computing system comprising a processor and a memory comprising instructions, which are executed by the processor to cause the processor to implement a system for virtual reality user authentication, the method comprising:
    detecting, using one or more sensors, an electronic device;
    determining, using the processor, that the electronic device is associated with a user;
    obtaining, using the processor, a user profile based on the user associated with the electronic device;
    presenting, based on the user profile, one or more program choices for user selection;
    activating, based on the user selection, a virtual reality authentication module;
    prompting, through a virtual reality system, the user to perform one or more real-life tasks specific to the user using the virtual reality system, wherein the task comprises sensor input indicative of actions and movements of the user's body;
    recording, through the virtual reality system, the pattern of actions and movements of the user's body using the one or more sensors; and
    storing, using an authentication server, sensor input indicative of actions and movements of the user's body as authentication requirements for accessing a virtual reality program.

2. The method as recited in claim 1, further comprising:
    receiving, from the user, an access request to the virtual reality program;
    requesting, via the virtual reality system, the user to perform the one or more real-life tasks;
    receiving, via the virtual reality system, a series of actions comprising one or more actions and movements of the user's body from the user;
    sending, to the authentication server, the series of actions;
    comparing, via the authentication server, the series of actions against the authentication requirements previously recorded; and
    if the series of actions are accurate within a predetermined threshold to the authentication requirements, allowing the user access to the virtual reality program.

3. The method as recited in claim 2, further comprising:
    sending, via the authentication server, a granted access event notification to a security program.

4. The method as recited in claim 2, further comprising:
    if the series of actions is not accurate within a predetermined threshold to the authentication requirements, denying the user access to the virtual reality program.

5. The method as recited in claim 4, further comprising:
    sending, via the authentication server, a denied access event notification to a security program.

6. The method as recited in claim 1, further comprising:
    displaying, via the virtual reality system, one or more program choices for selection by the user on a virtual reality authentication program splash screen.

7. The method as recited in claim 1, further comprising:
    collecting, via the virtual reality system, the one or more real-life activities of the user through one or more sensor devices.

8. A computer program product for virtual reality user authentication, the computer program product comprising a computer readable storage medium having program instructions embodied therewith, the program instructions executable by a processor to cause the processor to:
    detect, using one or more sensors, an electronic device;
    determine that the electronic device is associated with a user;
    obtain a user profile based on the user associated with the electronic device;
    present, based on the user profile, one or more program choices for user selection;
    activate, based on the user selection, a virtual reality authentication module;
    prompt, through a virtual reality system, the user to perform one or more real-life tasks specific to the user using the virtual reality system, wherein the task comprises sensor input indicative of actions and movements of the user's body;
    record, through the virtual reality system, the pattern of actions and movements of the user's body using the one or more sensors; and
    store, using an authentication server, sensor input indicative of actions and movements of the user's body as authentication requirements for accessing a virtual reality program.

9. The computer program product as recited in claim 8, the processor further configured to:
    receive, from the user, an access request to the virtual reality program;
    request, via the virtual reality system, the user to perform the one or more real-life tasks;
    receive, via the virtual reality system, a series of actions comprising one or more actions and movements of the user's body from the user;
    send, to the authentication server, the series of actions;
    compare, via the authentication server, the series of actions against the authentication requirements previously recorded; and
    if the series of actions are accurate within a predetermined threshold to the authentication requirements, allow the user access to the virtual reality program.

10. The computer program product as recited in claim 9, the processor further configured to:
    send, via the authentication server, a granted access event notification to a security program.

11. The computer program product as recited in claim 9, the processor further configured to:
  if the series of actions is not accurate within a predetermined threshold to the authentication requirements, deny the user access to the virtual reality program.

12. The computer program product as recited in claim 11, the processor further configured to:
  send, via the authentication server, a denied access event notification to a security program.

13. The computer program product as recited in claim 8, the processor further configured to:
  display, via the virtual reality system, a virtual reality authentication program splash screen comprising one or more program choices for selection by the user.

14. The computer program product as recited in claim 13, the processor further configured to:
  customize, in the virtual reality display, the virtual reality authentication program splash screen based upon one or more pre-stored user preferences.

15. A system for virtual reality user authentication, comprising:
  a virtual reality system, comprising a display and one or more sensors, configured to:
  detect, using one or more sensors, an electronic device;
  determine that the electronic device is associated with a user;
  obtain a user profile based on the user associated with the electronic device;
  present, based on the user profile, one or more program choices for user selection;
  activate, based on the user selection, a virtual reality authentication module;
  prompt the user to perform one or more real-life tasks specific to the user using the virtual reality system, wherein the task comprises sensor input indicative of actions and movements of the user's body;
    record the pattern of actions and movements of the user's body using the one or more sensors; and
    store, using an authentication server, sensors input indicative of actions and movements of the user's body as authentication requirements for accessing a virtual reality program.

16. The virtual reality user authentication system as recited in claim 15, the virtual reality system further configured to:
  receive, from the user, an access request to the virtual reality program;
  request the user to perform the one or more real-life tasks;
  receive a series of actions comprising one or more from the user; and
  send, to the authentication server, the series of actions;
  wherein the authentication server is further configured to:
    compare the series of actions against the authentication requirements previously recorded;
    if the series of actions are accurate within a predetermined threshold to the authentication requirements, allow the user access to the virtual reality program.

17. The virtual reality user authentication system as recited in claim 16, the authentication server further configured to:
  if the series of actions is not accurate within a predetermined threshold to the authentication requirements, deny the user access to the virtual reality program.

18. The virtual reality user authentication system as recited in claim 17, the authentication server further configured to:
  send, via the authentication server, a denied access event notification to a security program.

19. The virtual reality user authentication system as recited in claim 15, the virtual reality system further configured to:
  display a virtual reality authentication program splash screen comprising one or more program choices for selection by the user.

* * * * *